ns Patent [19]

[11] 3,957,718

Pochert et al.

[45] May 18, 1976

[54] COMPOSITIONS CONTAINING SILICA, A PHENOPLAST OR AN AMINOPLAST, AND A SILANE

[75] Inventors: Johannes Pochert, Walberberg; Siegfried Wolff, Bornheim-Merten; Friedrich Thurn, Rodenkirchen, all of Germany

[73] Assignee: Deutsche Gold- und Silber-Scheideanstalt vormals Roessler, Germany

[22] Filed: Dec. 26, 1974

[21] Appl. No.: 536,478

[30] Foreign Application Priority Data
Jan. 10, 1974   Germany............................ 2401056

[52] U.S. Cl. .............................. 260/38; 106/308 M; 106/308 N; 106/308 Q; 152/330 R; 260/39 SB; 260/42.15; 260/42.16
[51] Int. Cl.[2] ...................... C08K 3/36; C08K 5/54; C08K 9/06; C08L 61/06
[58] Field of Search ............... 260/38, 39 SB, 42.14, 260/42.15, 42.16; 106/308 Q, 308 M, 308 N

[56]  References Cited
UNITED STATES PATENTS

| | | | |
|---|---|---|---|
| 2,827,474 | 3/1958 | Kress................ | 260/39 SB |
| 3,650,810 | 3/1972 | Marzocchi............ | 260/38 |
| 3,746,669 | 7/1973 | Dunnom et al........ | 260/38 |
| 3,751,331 | 8/1973 | Dane et al. .......... | 260/38 |
| 3,798,196 | 3/1974 | Rocktaschel et al. ..... | 260/42.37 |
| 3,842,111 | 10/1974 | Meyer-Simon et al. ...... | 260/42.37 |
| 3,847,860 | 11/1974 | Seiler et al............ | 260/38 |

*Primary Examiner*—Donald E. Czaja
*Assistant Examiner*—H. H. Fletcher
*Attorney, Agent, or Firm*—Cushman, Darby & Cushman

[57]   ABSTRACT

Silica containing mixtures for the improvement of the adhesion of vulcanizable mixtures of natural and/or synthetic rubber to reinforcing fillers or supports of textile and/or metallic fabrics after the vulcanization are prepared that substantially consist of (A) active synthetically produced silica or silicates having a specific surface area according to the BET procedure of about 50 to 500 m²/g and an average primary particle size of from about 5 to 100 and at least one of (B) phenolic resin or aminoplast forming components, namely on the one hand phenols and/or amines and on the other hand aldehydes or aldehyde donors, and/or at least (C) one organosilane which can be a bisalkoxysilylalkyl-oligosulfide of the formula
 I. Z-Alk-$S_n$-Alk-Z, in which Z stands for the group

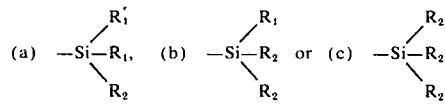

in which $R_1$ is an alkyl group with 1 to 4 carbon atoms or the phenyl group and $R_2$ is an alkoxy group with 1 to 8, preferably 1 to 4 carbon atoms, a cycloalkyl group with 5 to 8 carbon atoms or a straight or branched chain alkylmercapto group with 1 to 8 carbon atoms and wherein all the $R_1$ and $R_2$ groups can be the same or different. Alk is a divalent hydrocarbon group with 1 to 8 carbon atoms. It can be straight or branched chain and can be a saturated aliphatic hydrocarbon group, an unsaturated aliphatic hydrocarbon group or a cyclic hydrocarbon group. Preferably Alk has 1 to 6, most preferably 2 or 3 carbon atoms and n is a number of 2 to 6, especially 2, 3 or 4, most preferably 4.

The organosilane can be a mercapto group containing silane of the formula
 II. Z-Alk-SH
in which Z and Alk areas are defined as in formula I, or the organosilane can have the general formula
 III. Z-Alk-A wherein Z and Alk are as defined in formula I and A is the group
  a. N≡C-S-,
  b. R-S-,
  c. RO-CS-S-,
  d. RS-CS-S-, or
  e. $R_3$S-CS-S-
Where R and $R_3$ are monovalent organic groups, including hydrocarbon groups, saturated or unsaturated, branched or straight chain, acyclic, cyclic, heterocyclic or heteroaromatic group with 1 to 15 carbon atoms and 1 to 5 heteroatoms from the group of nitrogen, oxygen and sulfur and in formula III(e) $R_3$ can be

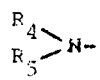

wherein $R_4$ and $R_5$ are the same or different and are hydrogen, alkyl of 1 to 3 carbon atoms, benzyl, cycloalkyl with 5 to 7 carbon atoms or both together with the nitrogen atom form a ring having 5 to 8 atoms with up to one further nitrogen, oxygen or sulfur atom. R preferably is hydrocarbon with 1 to 8 carbon atoms, e.g., alkyl or alkenyl or heterocyclic with up to 3 nitrogen atoms.

25 Claims, No Drawings

COMPOSITIONS CONTAINING SILICA, A PHENOPLAST OR AN AMINOPLAST, AND A SILANE

The invention concerns a silica containing mixture for the improvement of the adhesion of vulcanizable mixtures of natural and/or synthetic rubbers to reinforcing fillers or supports of textile and/or metallic fabrics after the vulcanization.

United articles of rubber-textile and rubber-metal, as for example automobile tires, conveyer belts, etc., or buffers, resilient cushioning, steel corded tires or rubber articles equipped with steel cords are generally subjected to considerable dynamic stresses. These articles are generally reinforced with textiles or metal fibers or also glass fibers in the form of cords or fabrics. Thereby it is important that the rubber layer adheres as strongly as possible to the reinforcing filler or support, it being immaterial whether the latter employs natural fabrics, or synthetic fibers of polyesters or polyamides or glass fibers or metal fibers. As is known the fabric is prepared for this purpose by means of rubber latex and a phenol-formaldehyde condensation product wherein usually resorcinol is employed as the phenol. On the one hand these resin components react with the functional groups in the textile material and on the other hand with the elastomers used and thus cause the adhesion of the rubber layer to the fabric. If now the elastomer is natural or synthetic rubber and is as usual reinforced with carbon black as filler, to which mixture resorcinol and hexamethylenetetramine are added, the latter as a formaldehyde donor, then the resin formation occurs during the vulcanization and causes the adhesion of the vulcanizate to the prepared or unprepared filler or support. The increased requirements in practice of such a united article, however, require as high an adhesion as possible of the elastomer to the fabric, therewith also at high dynamic stresses not to detach the filled rubber layer and the fabric from each other.

According to a known process the improvement of the adhesion of the mixtures of natural or synthetic rubber to prepared or unprepared textiles by means of condensation products of phenols or amines and aldehydes capable of forming resins can be attained by using a rubber mixture in which there is worked in as filler active silica in amounts of from 10 to 100 parts by weight based on 100 parts by weight of elastomer, the silica being used alone or blended with carbon black, whereby as active silicas there can be used both silica precipitated in finely divided amorphous form from waterglass by means of acid and also silicas produced as finely divided powders by the thermal procedure, with a specific surface area according to BET of 30 to 400 m$^2$/g and an average primary particle size of 10 to 400 microns. Thereby by reaction of the resin components with the functional groups of the textile material, the elastomer and the reinforcing filler there is made possible a substantial increase in the adhesion value.

According to another known process for the adhesive binding of vulcanizable mixtures of natural or synthetic rubber which contain silica as well as phenols and/or amines and aldehydes or aldehyde doner compounds donor textiles by embedding the textile in vulcanizable rubber mixtures and vulcanizing the rubber mixtures are used in which the resin forming components before the mixing in the elastomer are ground with the fillers or are bound to the fillers by absorption of the resin forming components from their solutions in a solvent.

In rubber engineering tests it has been shown that these premixtures make possible a substantially better distribution of the resorcinol in the rubber, to be sure even in the use of a mixing process unfavorable for the distribution of the components, as for example on rolls in place of kneaders which finds expression in the strongly increased adhesion of the vulcanizate to the textile.

In the adhesion of vulcanizable rubber mixtures to metals substantially the same methods are employed today although the adhesion mechanism cannot be fully equated with that of textile (glass fibers) supports.

The adhesion of vulcanizable rubber mixtures to metals, preferably brass, proceeds by bringing to the metal support a rubber mixture provided with the customary formulation building components and vulcanizing agents, which mixture is produced by working on rolls or in an internal mixer and which is provided with a high proportion of activated carbon black and sulfur and vulcanizing the mixture under pressure where the sulfur not consumed by the vulcanization reaction effects the adhesion of the rubber mixture to the metal surface with formation of sulfur bridges. In the further development the carbon black is partially replaced by active light fillers (silica) and investigations have been made about the use of these light fillers, especially activated silica, in order to determine whether these mixtures are suitable for the rubber-metal bond, which leads to the result that silica additives limit the increase of the adhesive value whereby the binding value is reduced with increased surface area of the silica.

The previously attained rubber-metal bond generally suffices for such purposes in which the compressive strength and tension and to a certain extent also the shear strength of the united articles is exposed; however, the adhesion there is no longer sufficient if bending forces with elastic spring-back resilience are encountered, since in such cases the sulfur bridges built with the metal (and on the metal side show a crystalline metal sulfide character) break off. The addition of finely divided silica hereby effects to be sure a certain improvement of the adhesive value, which, however, at higher requirements over longer time spans likewise no longer is sufficient for the requirements placed thereon.

For substantially increased requirements of rubber-metal-united articles in today's practice, the adhesive values obtained by known processes are no longer sufficient so that one endeavors to still substantially improve the adhesion, therewith that the filled vulcanized rubber layer and the metal remain solidly joined together even at stronger dynamic stresses. This type of improvement can be attained according to a known process if there is added to the rubber mixture before the vulcanization to the metal, active-finely divided silicas and silicates, in a given case blended with carbon black as well as components capable of synthetic resin formation such as resorcinol and hexamethylenetetramine. A further improvement of the adhesion of the rubber mixtures to metals can be produced according to these known processes by admixing with the rubber mixture heavy metal oxides, as, for example, especially lead oxide.

In practice the previously described rubber mixtures with the adhesion improving additives in their use with the various reinforcing supports, especially of metallic materials, show different values whereby these are not always sufficient in the case of the use of galvanized or brass coated steel cords to meet the requirements placed in the production of tires.

The object of the invention consists of the development of adhesion improving additives for vulcanizable elastomer mixtures which on the one hand are usable for the customary elastomer mixtures today and on the other hand produce an optimum adhesion value for the elastomer mixtures and on especially galvanized and brass coated steel cords as well as a better stability against reversion depending on the vulcanization time and temperature.

By increasing the dosaging of the silica and reducing the carbon black dosaging (see the example) there is attained an increase in the adhesiveness, above all to steel cords (brass plated) and also a better reversion resistance depending on the vulcanization time and vulcanization temperature. A minimal increase of adhesiveness, statically measured, is reached with zinc plated steel cords. By this procedure (see the example) however, the 300 modulus of the vulcanizate in spite of the necessary additional concomitant use of Vulkacit D (diphenyl guanidine) is lowered by practically ⅓ which is a known peculiarity of the increase in the dosaging of silica. However, such a mixture is not suited for steel corded tires, the same whether there are used brass coated or zinc plated steel cords.

The invention is based therefore on the problem of developing a silica containing mixture for improving the adhesion of vulcanizable mixtures of natural and/or synthetic rubber to reinforcing fillers or supports of textiles and/or metallic fabrics after the vulcanization, by means of which the previously mentioned disadvantages are substantially avoided.

According to the invention there is provided a mixture which substantially consists of (A) active synthetically produced silica or silicates having a specific surface area according to the BET procedure of about 50 to 500 m²/g and an average primary particle size of from about 5 to 100 microns and at least one of (B) phenolic resin or aminoplast forming components, namely on the one hand phenols and/or amines and on the other hand aldehydes or aldehyde donors, and/or at least (C) one organosilane which can be a bisalkoxysilylalkyl-oligosulfide of the formula Z-Alk-S$_n$-Alk-Z,   I in which Z stands for the groups

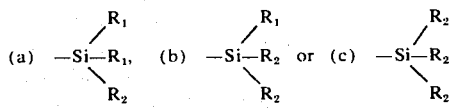

in which R$_1$ is an alkyl group with 1 to 4 carbon atoms or the phenyl group and R$_2$ is an alkoxy group with 1 to 8, preferably 1 to 4 carbon atoms, a cycloalkyl group with 5 to 8 carbon atoms or a straight or branched chain alkylmercapto group with 1 to 8 carbon atoms and wherein all the R$_1$ and R$_2$ groups can be the same or different. Alk is a divalent hydrocarbon group with 1 to 18 carbon atoms. It can be straight or branched chain and can be a saturated aliphatic hydrocarbon group, an unsaturated aliphatic hydrocarbon group or a cyclic hydrocarbon group. Preferably Alk has 1 to 6, most preferably 2 or 3 carbon atoms and n is a number of 2 to 6, especially 2, 3 or 4, most preferably 4.

The organosilane can be a mercapto group containing silane of the formula

Z-Alk-SH   II in which Z and Alk areas are defined in formula I, or the organosilane can have the general formula Z-Alk-A   III wherein Z and Alk are as defined in formula I and A is the group a. N ≡ C-S-,
b. R-S-,
c. RO-CS-S-,
d. RS-CS-S-, or
e. R$_3$S-CS-S-

Where R and R$_3$ are monovalent organic groups, including hydrocarbon groups, saturated or unsaturated, branched or straight chain, acyclic, cyclic, heterocyclic or heteroaromatic group with 1 to 15 carbon atoms and 1 to 5 heteroatoms from the group of nitrogen, oxygen and sulfur and in formula III(e) R$_3$ can be

wherein R$_4$ and R$_5$ are the same or different and are hydrogen, alkyl of 1 to 3 carbon atoms, benzyl, cycloalkyl with 5 to 7 carbon atoms or both together with the nitrogen atom form a ring having 5 to 8 atoms with up to one further nitrogen, oxygen or sulfur atom. R preferably is hydrocarbon with 1 to 8 carbon atoms, e.g., alkyl or alkenyl or heterocyclic with up to 3 nitrogen atoms.

As organosilane (C) can advantageously be used a compound according to formula I in which Alk is alkylene, e.g., ethylene or propylene and Z is

where R$_2$ is alkoxy of 1 to 4 carbon atoms.

In the following example there was added as organosilane (C) bis (3-triethoxysilylpropyl) tetrasulfide.

In the silica containing mixture there is preferably included as synthetic resin (B) forming components resorcinol and/or hexamethylenetetramine in such amount that components (B) and/or (C) are at least 3% of the component (A). Thus, the total of (B) and (C) can be 3% to 100% of (A). When both (B) and (C) are present the ratio of (B) to (C) can be from 10% to 90% (B) and 90% to 10% (C) based on total of (B) and (C).

While it is preferable to employ resorcinol as the phenol there can be employed other conventional phenols such as phenol per se, cresol, xylenol, t-butylphenol, etc. While hexamethylenetetramine is the preferred aldehyde donor there can be used other aldehydes or aldehyde donors such as formaldehyde, paraformaldehyde, trioxane, acetaldehyde, butyraldehyde, furfural or benzaldehyde. As aminoplast forming reactants there can be used for example urea, melamine, thiourea, aniline, guanidine, dicyandiamide with same aldehydes or aldehyde donors as above.

As silicas and silicates there can be used for example highly dispersed silicas produced for example by precipitation from solutions of silicates, by hydrolysis and/or oxidative high temperature conversion. There can also be used silicas made by flame hydrolysis of volatile silicon halides, e.g., silicon tetrachloride, or by electric arc processes.

There can be used synthetic silicates such as aluminum silicate or alkaline earth silicates such as magnesium or calcium silicates.

The siliceous fillers can be added in an amount of 5 to 150 pbw per 100 pbw of elastomer.

The vulcanizable elastomers employed include natural rubber and synthetic rubbers, e.g., diene elastomers such as polybutadiene, polyisoprene, e.g., cis-polyisoprene, butadiene styrene copolymer, butadieneacrylonitrile copolymer, butadienevinyl pyridine copolymer, polymerized 2-chlorobutadiene, butyl rubber, halogenated butyl rubber such as chlorinated butyl rubber and brominated butyl rubber as well as other known diene rubbers as for example terpolymers of ethylene, propylene and for example conjugated polyenes, e.g., ethylene-propylene cyclooctadiene, ethylene-propylenenorbornadiene, ethylene-propylene-dicyclopentadiene and ethylene-propylene-cyclododecatriene.

Examples of organosilanes within formula I which can be used in the invention are bis[trialkoxysilyl-alkyl-(1)]-polysulfides such as bis[2-trimethoxy-, -triethoxy-, -tri(methyl-ethoxy)-, -tripropoxy-, -tributoxy and so forth up to -trioctyl-oxysilyl-ethyl]-polysulfides, namely the di-, tri-, tetra-, penta-, and hexasulfides, further the bis-[3-trimethoxy-, -triethoxy-, -tri-(methylethoxy)-, -tripropoxy-, -tributoxy- and so forth up to -trioctoxypropyl]- polysulfide, namely again the di-, tri-, tetra-, penta- and hexasulfide; furthermore the corresponding bis[3-trialkoxysilylisobutyl]-polysulfides, the corresponding bis[4-trialkoxysilyl-butyl]-polysulfides and so forth up to bis[6-trialkoxysilyl-hexyl]-polysulfides. Of those chosen, there are preferred relatively simply constructed organosilanes of formula I including bis-[3-trimethoxy-, triethoxy-, and -tripropoxysilyl-propyl]-polysulfides namely the di-, tri- and tetrasulfides. These and the other organosilanes of formula I which can be added with good success can be made according to the process of Meyer-Simon U.S. Pat. No. 3,842,111 which corresponds to German patent applications P 2141159.6; P 2141160.9 and P 2212239.9. the entire disclosure of Meyer-Simon (and the corresponding German applications) is hereby incorporated by reference and relied upon. Typical examples of specific compounds within formula I which can be used in the invention include:

Examples of organosilane compounds useful in the invention include 3,3'-bis(trimethoxysilylpropyl)disulfide, 3,3'-bis(triethoxysilylpropyl)tetrasulfide, 3,3'-bis(trimethoxysilylpropyl) tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trioctoxysilylpropyl)tetrasulfide, 3,3'-bis(trihexoxysilylpropyl)disulfide, 3,3'-bis(tri-2''-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclohexoxysilylpropyl)tetrasulfide, 3,3'-bis(tricyclopentoxysilylpropyl)trisulfide, 2,2'-bis(tri-2''-methylcyclohexoxysilylethyl)tetrasulfide, bis(trimethoxyxilylmethyl)tetrasulfide, 3,3'-bis(trimethylmercaptosilylpropyl)tetrasulfide, 2,2'-bis(triethylmercaptosilylethyl)disulfide, 2,2'-bis(tributylmercaptosilylethyl)trisulfide, 2,2'-bis(tri sec. butylmercaptosilylethyl)trisulfide, 3,3'-bis(trioctylmercaptosilylpropyl)tetrasulfide, 2,2'-bis(trihexylmercaptosilylethyl)hexasulfide, 3,3'-bis(ethyldipropylmercaptosilylpropyl)tetrasulfide, 3-methoxy ethoxy propoxysilyl 3'-diethoxybutoxysilylpropyl-tetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl)tetrasulfide, 3,3'-bis(di-t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis(diphenyl cyclohexoxysilylpropyl)disulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec. butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyldodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxy methylsilylpentyl)trisulfide, 3,3'-bis(trimethoxysilyl-2-methyl propyl)tetrasulfide, 3,3'-bis(dimethoxyphenylsilyl-2-methylpropyl)disulfide.

Typical examples of compounds within formula II are:

2-mercaptoethyl trimethoxy silane,
3-mercaptopropyl trimethoxy silane,
3-mercaptopropyl triethoxy silane,
2-mercaptoethyl tripropoxy silane,
2-mercaptoethyl tributoxy silane,
2-mercaptoethyl tri sec. butoxy silane,
3-mercaptopropyl triisopropoxy silane,
3-mercaptopropyl trioctoxy silane,
2-mercaptoethyl tri 2'-ethylhexoxy silane,
2-mercaptoethyl dimethoxy ethoxy silanes,
3-mercaptopropyl dimethoxy methyl silane,
3-mercaptopropyl methoxy dimethyl silane,
3-mercaptopropyl dimethoxy methylmercapto silane,
3-mercaptopropyl methoxy di(methylmercapto) silane,
3-mercaptopropyl methoxy methyl methylmercapto silane,
2-mercaptoethyl tris(methylmercapto) silane,
2-mercaptoethyl tris(isopropylmercapto) silane,
3-mercaptopropyl tributylmercapto silane,
3-mercaptopropyl tris(octylmercapto) silane,
3-mercaptopropyl cyclohexoxy dimethyl silane,
4-mercaptobutyl trimethoxy silane,
3-mercaptocyclohexyl trimethoxy silane,
12-mercaptododecyl trimethoxy silane,
18-mercaptooctadecyl trimethoxy silane,
18-mercaptooctadecyl methoxy dimethylsilane.

As compounds within formula III there can be used any of those set forth in Rockaschel U.S. Pat. No. 3,798,196, the entire disclosure of which is hereby incorporated by reference and relied upon. Examples of such compounds include:

3-thiocyanatopropyl triethoxy silane, 3-thiocyanatopropyl trimethoxy silane,
3-thiocyanatopropyl tripropoxy silane,
3-thiocyanatopropyl diethoxy methyl silane,
3-thiocyanatopropyl tributoxy silane,
4-thiocyanatobutyl triethoxy silane,
6-thiocyanatohexyl triisopropoxy silane,
18-thiocyanatooctadecyl trimethoxy silane,
1,3(3-thiocyanatopropyl)-1,1,3,3-tetramethoxy disiloxane,
1,3-(3-thiocyanatopropyl)-1,1,3,3-tetraethoxy disoxane,
2-diethylamino-4-mercapto-6-(3-triethoxysilylpropyl)-thiotriazine,
2-dimethylamino-4-mercapto-6-(4-triisopropoxysilylbutyl)-thiotriazine,
2-amino-4-mercapto-6-(3-trimethoxysilyl propyl)-thiotriazine,
2-diphenylamino-4-mercapto-6-(5-tributoxysilyl amyl)-thriotriazine,
2-phenylamino-4-mercapto-6-(3-triethoxysilyl propyl)-thiotriazine,
2-butylamino-4-mercapto-6-(18-triethoxysilyl octadecyl)-thiotriazine,
allythiopropyl trimethoxy silane,
pentadecenylthiopropyl trimethoxy silane,
2 ,4-dimercapto-6-(3-triethoxysilylpropyl)-thiotriazine,
2-mercapto-4-(3-triethoxysilyl propyl)-thiotriazine,
2-mercapto-4-(3-tripropoxysilyl propyl)-thiotriazine,
2-methyl-4-mercapto-6-(3-tributoxysilyl propyl)-thiotriazine,
2-mercapto-5-(3-triethoxysilyl propyl)-thio-1,3,4-thia-diazole,
3-triethoxysilylpropyl-ethyl-xanthogenate,
3-trimethoxysilylpropyl-ethyl-xanthogenate,
3-tripropoxysilylpropyl-ethyl-xanthogenate,
3-triisopropoxysilylpropylethyl-xanthogenate,
3-tributoxysilylpropyl-ethyl-xathogenate,
3-triethoxysilylpropyl-methyl-xanthogenate,
3-trimethoxysilylpropyl-propyl-xanthogenate,
3-trimethoxysilylpropyl-isodecyl-xanthogenate,
3-triethoxysilypropyl-2'-ethyl hexyl-xanthogenate,
3-triethoxysilylpropylpentadecyl-xanthogenate,
3-triethoxysilylpropyl-allyl-xanthogenate,
4-tributoxysilylbutyl-ethy-xanthogenate,
18-triethoxysilyloctadecyl-methyl-xanthogenate,
1,3-(3-S-thiocarbomethoxypropyl)-1,1,3,3-tetramethoxy disiloxane,
1,3-(3-S-thiocarboethoxypropyl)-1,1,3,3-tetraethoxy disiloxane,
3-triethoxysilylpropyl-ethyl-thioxanthogenate,
3-tripropoxysilylpropyl-methyl-thioxanthogenate,
3-triethoxysilylpropyl-isobutyl-thioxanthogenate,
3-triethoxysilylpropyl-allyl-thioxanthogenate,
1,3-(3-S-thiocarbomethylmercapto propyl)-1,1,3,3-tetramethoxy disiloxane,
3-triethoxysilyl-propyl-N-methyl-dithiocarbamate,
3-trimethoxysilyl-propyl-N-ethyl-dithiocarbamate,
3-trimethoxysilyl-propyl-N-ethyl-dithiocarbamate,
3-tributoxysilyl-propyl-N-hexyl-dithiocarbamate,
4-triisopropoxysilyl-butyl-N-octyl-dithiocarbamate,
3-triethoxysilyl-propyl-N-allyl-dithiocarbamate, .
3-dipropoxymethylsilyl-propyl-N-allyl-dithiocarbamate,
3-trimethoxysilyl-propyl-N-allyl-dithiocarbamate,
3-triethoxysilyl-propyl-N-diallyl-dithiocarbamate,
4-trimethoxysilyl-butyl-N,N-diallyl-dithiocarbamate,
3-triethoxysilyl-propyl-N-cyclohexyl-dithiocarbamate,
4-tripropoxysilyl-butyl-N,N-dicyclohexyl-dithiocarbamate,
3-trimethoxysilyl-propyl-piperidino-dithiocarbamate,
3-triethoxysilyl-propyl-morpholino-dithiocarbamate,
3-triethoxysilyl-propyl-N,N-dibenzyl-dithiocarbamate,
3-triethoxysilyl-propyl-N-cyclohexyl-N-ethyl-dithiocarbamate,
1,3-(3N,N-diallyl dithiocarbaminato propyl)-1,1,3,3-tetraisopropoxy disiloxane.

The silanes used in the invention can be employed in the rubber mixtures in amounts of 0,1 to 25 weight %, preferably in the range between 1 and 15 weight % of the total composition.

The described organosilicon compounds especially for easier dosability and handling can be mixed with a portion of the filler to be used, whereby the liquid organo-silanes are converted into a powdery product and thus can be used. It is also possible, however, in a given case, although not combined with special advantages, to uniformly bring the organosilane to the surface of the filler particles and to use the particles in this manner. The manners of use set forth can also be combined with each other.

By using the above-named silica containing componds it is possible at increased silica dosages and reduced carbon black dosage to produce an increase of the adhesive value with simultaneous increase of the modulus to the required value.

In the following tables there are given examples using the mixtures of the invention. The invention, however, is not limited to the example.

Unless otherwise indicated all parts and percentages are by weight.

By the insertion of the silane -$SiO_2$ mixture (Mixture 3) the modulus was again brought to the required size as in Mixture 1. Thereby it must be considered that the silica dosage was reduced about 5 parts by weight since 5 parts of silica were introduced into the mixture as part of the total of 10 parts of 50% $SiO_2$ and 50% silane.

Concerning the statically measured adhesive values to the brass coated steel cord the value of Mixture 3 is considerably increased over that of Mixture 1 but not so great when compared to those of mixture 2, with simultaneously a good resistance to reversion depending on time and temperature.

The statically measured adhesive values of mixture 3 on zinc plated steel cord are practically double those of mixture 1, and are significantly greater than those of mixture 2, with the same good reference to reversion depending on time and temperature.

TABLE 1

| Example | 1 | 2 | 3 |
|---|---|---|---|
| Smoked Sheets Defo 500 | 20 | 20 | 20 |
| Buna Huls 1509 (butadiene-styrene rubber) | 80 | 80 | 80 |
| Corax 3 (furnace black HAF) | 45 | 15 | 15 |
| Ultrasil VN3 (precipitated silica) | 15 | 45 | 40 |
| Stearic Acid | 1 | 1 | 1 |
| Antioxidant (Phenyl-B-napthylamine | | | |
| Naftolen ZD (aromatic hydrocarbon plasticiser) | 4 | 4 | 4 |
| Zinc oxide (active) | 4 | 4 | 4 |
| Pb O (Lead oxide) | 2 | 2 | 2 |
| Mixture of 50% $SiO_2$ and 50% bis (3triethoxysilylpropyl) polysulfide | — | — | 10 |

TABLE 1-continued

| Example | 1 | 2 | 3 |
|---|---|---|---|
| Cofill 11 (Mixture of 50% SiO₂ and 50% resorcinol) | 6 | 6 | 6 |
| Hexamethylenetetramine | 1.5 | 1.5 | 1.5 |
| Sulfur | 2.3 | 2.3 | 2.3 |
| Vulkacit DZ (Benzothiazyl-2-dicyclohexylsulfenamide) | | | |
| Vulkacit D (Diphenyl guanidine) | | .2 | |
| Modulus 300 kp/cm² | 149 | 90 | 150 |

TABLE 2

Statically measured adhesive values kp/cm

1. Brass coated steel cord 7 × 3 × 0.15 mm

| | Mixture | | |
|---|---|---|---|
| | 1 | 2 | 3 |
| Vulcanization | | | |
| 60 min./145°C. | 35 | 42 | 47 |
| 60 min./160°C. | 22 | 43 | 45 |
| 100 min./160°C. | 19 | 36 | 35 |

2. Zinc plated steel cords 7 × 3 × 0.15 mm

| Vulcanization | | | |
|---|---|---|---|
| 60 min./145°C. | 18 | 22 | 32 |
| 60 min./160°C. | 16 | 19 | 30 |
| 100 min./160°C. | 14 | 16 | 29 |

Dynamic adhesion values (cycles) on zinc plated steel cords, 8 mm diameter, 560 kp load

| Vulcanization | | | |
|---|---|---|---|
| 60 min./160°C. | 12,000 | 12,000 | 80,000 |

Concerning the dynamic adhesion this was measured on zinc plated steel cords such as are used for conveyor belts whereby a load of 560 kp and 6 cycles/min were used. From the values it can be seen that only through the admixed silane of the invention there is attained a substantial increase of the dynamic adhesiveness.

By addition of the silane there were attained an increase in the static adhesion to brass plated steel cords by use of more silica together with a simultaneous increased resistance to reversion, increase of the modulus of the vulcanizate to the required value with substantial increase in the static adhesive value to brass coated or zinc plated steel cords, and simultaneously good resistance to reversion, besides an enormous increase of the adhesiveness to zinc plated steel cords in the dynamical test.

The composition can comprise, consist essentially of or consist of the materials set forth.

What is claimed is:

1. A silica containing composition for the improvement of the adhesion of a vulcanizable mixture of natural or synthetic rubber to reinforcing fillers or supports of textile or metallic fabrics after the vulcanization which comprises, (A) a siliceous filler which is an active synthetically produced silica or silicate having a specific surface area according to the BET procedure of about 50 to 500 m²/g and an average primary particle size of from about 5 to 100 microns, (B) phenolic resin or aminoplast forming components, incluidng (1) a phenol or an amine and (2) an aldehyde or aldehyde donors, and (C) an oganosilane which is either (1) a bis-alkoxy-silyalkyl-oligosulfide of the formula $$Z\text{-Alk-}S_n\text{Alk-}Z, \quad \text{I}$$

in which Z stands for the groups

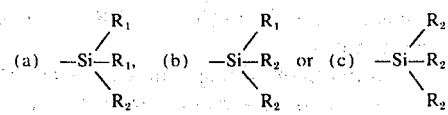

in which $R_1$ is an alkyl group with 1 to 4 carbon atoms or the phenyl group and $R_2$ is an alkoxy group with 1 to 8 carbon atoms, a cycloalkyl group with 5 to 8 carbon atoms or an alkylmercapto group with 1 to 8 carbon atoms, Alk is a divalent hydrocarbon group with 1 to 18 carbon atoms, n is a number of 2 to 6, $$Z\text{-Alk-SH} \quad \text{II}$$

in which Z and Alk are as defined in formula I, or the organosilane can have the general formula $$Z\text{-Alk-A} \quad \text{III}$$

wherein Z and Alk are as defined in formula I and A is the group a. N≡C-S,
b. R-S-,
c. RO-CS-S,
d. RS-CS-S-, or
e. R₃S-CS-S-, Where R and $R_3$ are monovalent hydrocarbon groups, heterocyclic or heteroaromatic groups with 1 to 15 carbon atoms and 1 to 5 heteroatoms from the group of nitrogen, oxygen and sulfur and wherein in formula III(e) $R_3$ can be

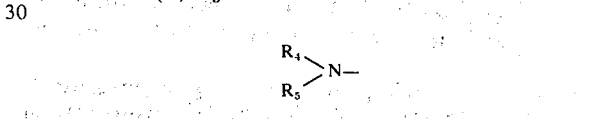

wherein $R_4$ and $R_5$ are hydrogen, alkyl of 1 to 5 carbon atoms, benzyl, cycloalkyl with 5 to 7 carbon atoms or both together with the nitrogen atom form a ring having 5 to 8 carbon atoms with up to one further nitrogen, oxygen or sulfur atom, the total of (B) and (C) being 3 to 100% of (A) and (B) is 10 to 90% of the total of (B) and (C).

2. A siliceous filler containing composition according to claim 1 wherein when (C) is III(e) it is other than

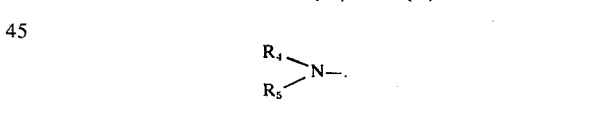

3. A siliceous filler containing composition according to claim 1 wherein Alk is a divalent hydrocarbon group with 1 to 18 carbon atoms and n is a number from 2 to 4.

4. A siliceous filler containing composition according to claim 3 wherein Alk is a divalent hydrocarbon group with 1 to 18 carbon atoms and n is a number from 3 to 4.

5. A siliceous filler containing composition according to claim 1 wherein (B) includes (1) a phenol and (2) formaldehyde or a formalehyde donor.

6. A siliceous filler containing composition according to claim 1 wherein (C) has formula I.

7. A siliceous filler containing composition according to claim 6 wherein Z is

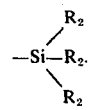

8. A siliceous filler containing composition according to claim 7 wherein Alk is alkylene and $R_2$ is alkoxy of 1 to 4 carbon atoms.

9. A siliceous filler containing composition according to claim 8 wherein Alk is ethylene or propylene.

10. A siliceous filler containing composition according to claim 9 wherein (C) contains bis(3-triethoxysilylpropyl)-polysulfide having 2 to 4 sulfur atoms.

11. A siliceous filler containing composition according to claim 7 wherein (B) contains resorcinol.

12. A siliceous filler containing composition according to claim 11 where (B) also contains hexamethylenetetramine.

13. A silica containing vulcanizable composition comprising a vulcanizable natural or synthetic rubber and the composition of claim 1, the amount of siliceous filler being 5 to 150 parts per 100 parts of rubber.

14. A siliceous filler containing composition according to claim 13 wherein when (C) is III(e) it is other than

15. A siliceous filler containing composition according to claim 14 wherein Alk is a divalent hydrocarbon group with 1 to 18 carbon atoms and n is a number from 2 to 4.

16. A siliceous filler containing composition according to claim 15 wherein Alk is a divalent hydrocarbon group with 1 to 18 carbon atoms and n is a number from 3 to 4.

17. A siliceous filler containing composition according to claim 14 wherein (B) includes (1) a phenol and (2) formaldehyde or a formaldehyde donor.

18. A siliceous filler containing composition according to claim 14 wherein (C) has formula I.

19. A siliceous filler containing composition according to claim 18 wherein Z is

20. A siliceous filler containing composition according to claim 19 wherein Alk is alkylene and $R_2$ is alkoxy of 1 to 4 carbon atoms.

21. A siliceous filler containing composition according to claim 20 wherein Alk is ethylene or propylene.

22. A siliceous filler containing composition according to claim 21 wherein (C) contains bis(3-triethoxysilylpropyl)-polysulfide having 2 to 4 sulfur atoms.

23. A siliceous filler containing composition according to claim 19 wherein (B) contains resorcinol.

24. A siliceoous filler containing composition according to claim 23 where (B) also contains hexamethylenetetramine.

25. A silica containing composition according to claim 14 wherein the vulcanizable composition includes sulfur.

* * * * *